US012613551B2

(12) United States Patent
He et al.

(10) Patent No.: US 12,613,551 B2
(45) Date of Patent: Apr. 28, 2026

(54) ELECTRONIC DEVICE

(71) Applicant: Huawei Technologies Co., Ltd.,
Shenzhen (CN)

(72) Inventors: Yisong He, Shenzhen (CN); Weisi Li,
Shenzhen (CN); Feng Xu, Shenzhen
(CN); Guoping Wu, Shenzhen (CN);
Bin Xie, Shenzhen (CN); Jianguo Xu,
Shanghai (CN)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 535 days.

(21) Appl. No.: 18/005,638

(22) PCT Filed: Jul. 13, 2021

(86) PCT No.: PCT/CN2021/105945
§ 371 (c)(1),
(2) Date: Jan. 16, 2023

(87) PCT Pub. No.: WO2022/012507
PCT Pub. Date: Jan. 20, 2022

(65) Prior Publication Data
US 2023/0273494 A1     Aug. 31, 2023

(30) Foreign Application Priority Data

Jul. 17, 2020     (CN) ......................... 202010693088.5

(51) Int. Cl.
G02F 1/163     (2006.01)
G02F 1/153     (2006.01)
(Continued)

(52) U.S. Cl.
CPC .......... *G06F 1/1626* (2013.01); *G02F 1/1533*
(2013.01); *G02F 1/163* (2013.01); *G06F*
*3/0482* (2013.01); *G06F 3/0484* (2013.01)

(58) Field of Classification Search
CPC .................. H04M 1/0283; G02F 1/132; G02F
1/133305; G02F 1/1334; G02F 1/137;
(Continued)

(56) References Cited

U.S. PATENT DOCUMENTS

| | | | | |
|---|---|---|---|---|
| 2010/0165440 A1* | 7/2010 | Nguyen | ................ | C23C 14/086 |
| | | | | 359/275 |
| 2020/0226999 A1* | 7/2020 | Wang | ....................... | G02F 1/163 |
| 2020/0379308 A1* | 12/2020 | Yang | ....................... | G02F 1/155 |

FOREIGN PATENT DOCUMENTS

| | | |
|---|---|---|
| CN | 101577747 A | 11/2009 |
| CN | 109581778 A | 4/2019 |

(Continued)

*Primary Examiner* — Alazar Tilahun
(74) *Attorney, Agent, or Firm* — Slater Matsil, LLP

(57) ABSTRACT

An electronic device includes: a battery, a mainboard, and a
housing. The battery is connected to the mainboard, the
mainboard is provided with a first controller, the battery and
the mainboard are installed in a cavity of the housing, and
the housing includes a rear cover. The rear cover includes an
electrochromic layer, the electrochromic layer is connected
to the mainboard, the first controller is configured to control
whether to power on the electrochromic layer, and a color
displayed on the electrochromic layer when the electrochro-
mic layer is powered on is different from a color displayed
when the electrochromic layer is not powered on. The rear
cover can change, by controlling a power-on and power-off
status of the electrochromic layer, a color displayed on the
electrochromic layer, and further change a color displayed
on the rear cover, without changing a decorative film.

20 Claims, 7 Drawing Sheets

(51) Int. Cl.
G06F 1/16 (2006.01)
*G06F 3/0482* (2013.01)
*G06F 3/0484* (2022.01)
(58) Field of Classification Search
CPC .... G02F 1/1533; G02F 1/163; G02F 1/16755;
G02F 1/1685; G02F 1/13345; G02F
1/133314; G02F 1/153; G02F 1/157;
G02F 1/1333; G02F 1/15; G02F 1/1508;
G02F 1/1675; H05K 5/03; G06F 1/1626;
G06F 1/163
See application file for complete search history.

(56) References Cited

FOREIGN PATENT DOCUMENTS

| | | |
|---|---|---|
| CN | 109613780 A | 4/2019 |
| CN | 110716361 A | 1/2020 |

* cited by examiner

ELECTRONIC DEVICE

CROSS-REFERENCE TO RELATED APPLICATIONS

This application is a National Stage of International Application No. PCT/CN2021/105945, filed on Jul. 13, 2021, which claims priority to Chinese Patent Application No. 202010693088.5, filed on Jul. 17, 2020. Both of the aforementioned applications are hereby incorporated by reference in their entireties.

TECHNICAL FIELD

This application relates to the field of electronic device technologies, and in particular, to an electronic device.

BACKGROUND

An electronic device has a rear cover. In actual use, the rear cover is located at an outermost side of the electronic device. Therefore, appearance performance and hand feeling of the rear cover affect overall appearance performance and hand feeling of the electronic device. Currently, in a process of using the electronic device, a user usually changes content displayed on the rear cover by pasting different decorative films, and content displayed on the decorative films determines the content displayed on the rear cover. However, with homogenization of the decorative films, the rear cover is gradually homogenized, and consequently, cannot meet individual requirements of users.

SUMMARY

This application provides an electronic device, and a color displayed on an electrochromic layer in a rear cover can be changed, so that an effect of the rear cover can be changed independently, and user experience is improved.

An embodiment of this application provides an electronic device. The electronic device includes a battery, a mainboard, and a housing. The battery is connected to the mainboard, the mainboard is provided with a first controller, the battery and the mainboard are installed in a cavity of the housing, and the housing includes a rear cover. The rear cover includes an electrochromic layer, the electrochromic layer is connected to the mainboard, the first controller is configured to control whether to power on the electrochromic layer, and a color displayed on the electrochromic layer when the electrochromic layer is powered on is different from a color displayed when the electrochromic layer is not powered on.

The rear cover in this embodiment of this application is provided with the electrochromic layer, and colors displayed on the electrochromic layer are different when the electrochromic layer is powered on and off, so that without changing a decorative film, a color displayed on the electrochromic layer can be changed by controlling a power-on and power-off status of the electrochromic layer, and a color displayed on the rear cover can be further changed. This has an advantage of convenient operation. Therefore, an effect displayed on the rear cover is not fixed in use, and a user can adjust, based on a requirement of the user (by changing the power-on and power-off status of the electrochromic layer), a color displayed on the rear cover. This meets an individual requirement of the user, and improves user experience of the electronic device and the rear cover of the electronic device.

In a possible design, when a different current is applied to the electrochromic layer, different content is displayed on the electrochromic layer. In this embodiment, the power-on and power-off status of the electrochromic layer and a magnitude of the current are changed, so that a plurality of different colors can be displayed on the electrochromic layer, and the rear cover can have a plurality of different effects, to meet an independent requirement of the user.

In a possible design, when the electrochromic layer is not powered on, the electrochromic layer is transparent, when a maximum current Amax is applied to the electrochromic layer, the electrochromic layer appears black, and when a current A applied to the electrochromic layer gradually increases from 0 to Amax, the color displayed on the electrochromic layer gradually deepens. Therefore, the power-on and power-off status of the electrochromic layer and the magnitude of the current are changed, so that different colors from transparent to black can be displayed on the electrochromic layer, and a larger current leads to a darker color. A current of the electrochromic layer can be changed to independently control the color displayed on the rear cover.

In a possible design, the mainboard is further provided with a second controller, the second controller is configured to determine whether a current needs to be applied and determine a value of the current A that is applied, and the first controller can control, based on a signal of the second controller, whether to power on the electrochromic layer, and control the value of the current A applied to the electrochromic layer.

In a possible design, the electronic device is provided with a user control interface, the user control interface includes a rear cover color choice, and the rear cover color choice includes two or more options. The mainboard is further provided with a chip, the chip is configured to identify an option tapped by the user, and the chip is configured to control the second controller, so that a color corresponding to the option is displayed on the electrochromic layer. Therefore, the user only needs to change an option for a color of the rear cover through the user control interface to enable a corresponding color to be displayed on the rear cover. This has an advantage of convenient operation.

In a possible design, the first controller is a power controller, and the second controller is a mainboard controller.

In a possible design, the mainboard is further provided with a chip and a third controller, the chip is configured to sense a state of the electronic device, and the third controller is connected to the first controller. The third controller is configured to control the first controller based on a sensing result of the chip, and then control whether to power on the electrochromic layer or control a magnitude of the current, by using the first controller. In this embodiment, the chip senses a state of the electronic device in a working process, and sends a signal to the third controller based on the state, and the third controller determines whether a current needs to be applied to the electrochromic layer in this state and determines a magnitude of the current, the third controller transfers a determining result to the first controller, so that the first controller can control the power-on and power-off status of the electrochromic layer and the magnitude of the current based on the determining result, thereby changing the color of the electrochromic layer. Therefore, through the third controller and the first controller, automatic control of the color of the rear cover can be implemented without manual control of the user, and display performance of the rear cover can be further improved; and according to the electronic device in this embodiment of this application, the color of the rear cover can be independently changed by the user, and in addition, the color of the rear cover can be independently changed during use of the electronic device, thereby further improving user experience.

In a possible design, when the electronic device is in an incoming call state, the third controller controls the first controller, so that a first current A1 is applied to the electrochromic layer by using the first controller; and when the electronic device is in a notification state, the third controller controls the first controller, so that a second current A2 is applied to the electrochromic layer by using the first controller. A color displayed on the electrochromic layer when the first current A1 is applied is different from a color displayed on the electrochromic layer when the second current A2 is applied. Therefore, the colors displayed on the rear cover of the electronic device are different in the incoming call state and the notification state, so that the user can determine the state of the electronic device only by the color, to reduce a possibility of missing a call, thereby further improving user experience of the electronic device.

In a possible design, the first controller is a power controller, and the third controller is a mainboard controller.

In a possible design, the electrochromic layer covers the rear cover.

In a possible design, the electrochromic layer forms one or more of a character, a pattern, and a LOGO. Therefore, when different content is displayed on the electrochromic layer, the one or more of the character, the pattern, and the LOGO are displayed in different colors.

In a possible design, the rear cover includes one or more electrochromic layers, and colors displayed on each of the electrochromic layers are the same or different. The electrochromic layers are arranged in a thickness direction, or the electrochromic layers are located on a same layer in the thickness direction. When a plurality of electrochromic layers are included, a displaying state of the rear cover is obtained through superposition of effects displayed on the electrochromic layers, so that the rear cover can present richer effects, and the rear cover can more meet an individual requirement of the user, thereby further improving user experience.

In a possible design, the electrochromic layer matches the cover, or in a plane perpendicular to a thickness direction, an area of the electrochromic layer is less than an area of the cover. The rear cover further includes a transparent layer, the transparent layer is located on a same layer in the thickness direction as the electrochromic layer, and the electrochromic layer is spliced with the transparent layer. Therefore, in an actual working condition, a size and a position of the electrochromic layer can be set according to specific requirements.

In a possible design, the rear cover further includes a decorative film, and the electrochromic layer and the decorative film are arranged in a thickness direction. In this embodiment, a final effect displayed on the rear cover is obtained through superposition of an effect displayed on the electrochromic layer and an effect displayed on the decorative film, thereby further enriching a display effect on the rear cover, so that the rear cover can further meet the individual requirement of the user, to improve user experience of the rear cover.

In a possible design, the rear cover includes one layer of the decorative film, and the decorative film is located at an end, of the electrochromic layer, away from the cover in the thickness direction.

In a possible design, the decorative film includes at least a first decorative film and a second decorative film. In the thickness direction, the electrochromic layer is located between the first decorative film and the cover, the second decorative film is located at an end, of the first decorative film, away from the electrochromic layer, or in the thickness direction, the electrochromic layer is arranged between the cover and the first decorative film, and between the first decorative film and the second decorative film.

In a possible design, the electrochromic layer is bonded to the cover through optical clear adhesive; or the electrochromic layer is formed on a surface of the cover through a coating process.

In a possible design, a material of the electrochromic layer includes an inorganic electrochromic material or an organic electrochromic material. The inorganic electrochromic material includes one or more of a group VI metal oxide and a group VIII metal oxide, and the organic electrochromic material includes one or more of polythiophenes and polythiophene derivatives, viologens, tetrathiafulvalenes, and metal phthalocyanine compounds.

In a possible design, the electrochromic layer includes a tungsten oxide layer, a silicon layer, and a nickel oxide layer in the thickness direction. The nickel oxide layer is doped with tungsten or vanadium.

It should be understood that the foregoing general descriptions and the following detailed descriptions are merely used as an example, and should not limit this application.

REFERENCE NUMERALS

Figure 1:
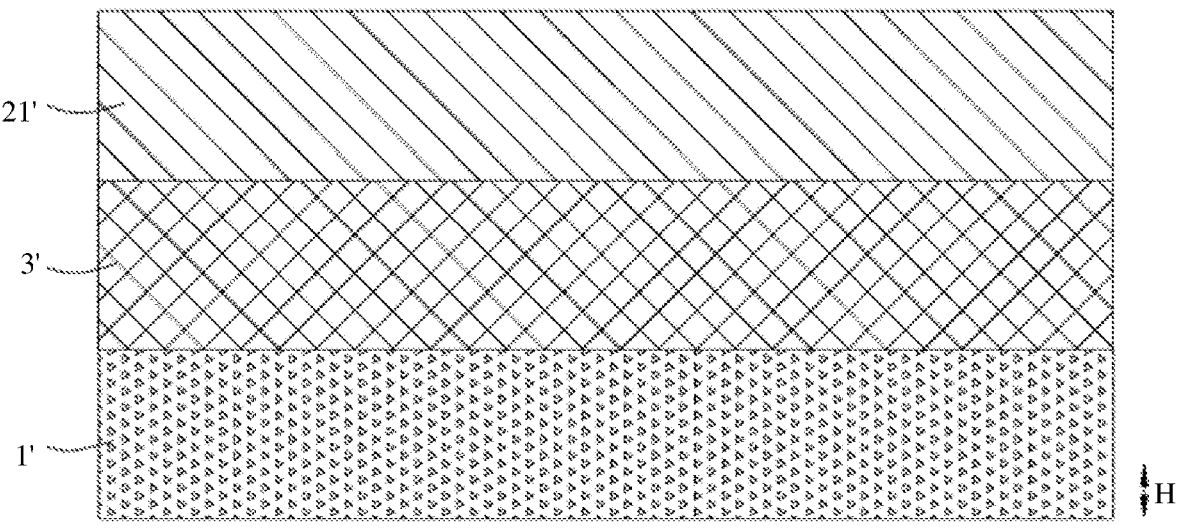
FIG. 1 is a schematic diagram of a laminated layer of a rear cover of an electronic device in a specific embodiment in the conventional technology.

1'. Cover 21'. First decorative film 22'. Second decorative film 3'. Optical clear adhesive layer 1. Cover 21. First decorative film 22. Second decorative film 3. Optical clear adhesive layer 4. Electrochromic layer 41. First electrochromic layer 42. Second electrochromic layer 43. Third electrochromic layer 5. Transparent layer The accompanying drawings herein are incorporated into this specification and constitute a part of this specification, show embodiments conforming to this application, and are used, together with this specification, to explain the principle of this application.

DETAILED DESCRIPTION OF ILLUSTRATIVE EMBODIMENTS

To better understand the technical solutions in this application, with reference to the accompanying drawings, the following describes in detail embodiments of this application.

It should be clear that the described embodiments are merely some embodiments of this application. All other embodiments obtained by a person of ordinary skill in the art based on embodiments of this application without creative efforts shall fall within the protection scope of this application.

In a specific embodiment, the following further describes this application in detail with reference to specific embodiments and the accompanying drawings.

Figure 2:
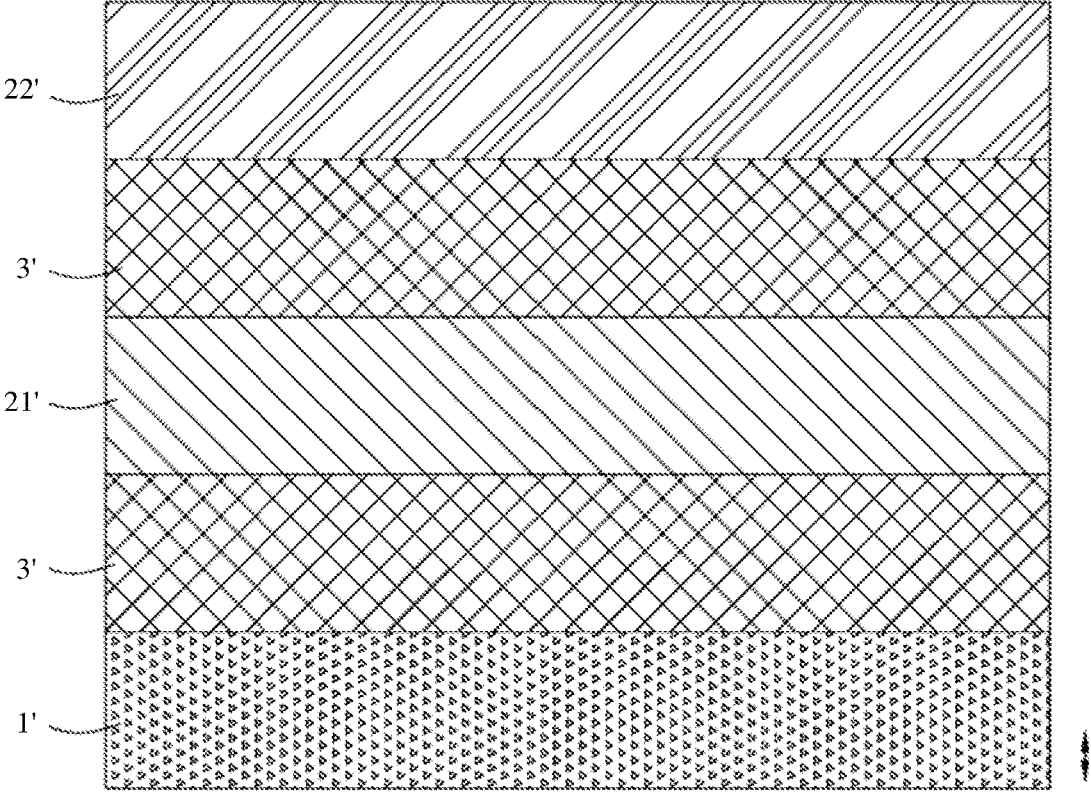
FIG. 2 is a schematic diagram of a laminated layer of a rear cover of an electronic device in another specific embodiment in the conventional technology.

In the conventional technology, a structure of a rear cover of an electronic device is shown in FIG. 1 and FIG. 2. As shown in FIG. 1, in a thickness direction H, the rear cover may include a cover 1' and a first decorative film 21'. The first decorative film 21' is stuck to the cover 1' through optical clear adhesive 3', and the first decorative film 21' may be designed to have a specific color and/or pattern, so that an appearance effect of the rear cover of the electronic device is displayed in a specific color and/or as a specific pattern. As shown in FIG. 2, in a thickness direction H, the rear cover includes a cover 1', a first decorative film 21', and a second decorative film 22'. The first decorative film 21' is stuck to the cover 1' through optical clear adhesive 3', and the second decorative film 22' is stuck to the first decorative film 22' through the optical clear adhesive 3'. The first decorative film 21' and the second decorative film 22' can be designed to have specific colors and/or patterns, and the colors and/or patterns of the first decorative film 21' and the second decorative film 22' can be the same or different, so that an appearance effect displayed on the rear cover is obtained through superposition of the first decorative film 21' and the second decorative film 22'. Therefore, compared with the solution shown in FIG. 1, this solution has a more complex effect displayed on the rear cover and a better effect.

However, effects displayed on the foregoing two types of rear covers are determined by the decorative films, and only a single effect can be displayed during use of the electronic device, which cannot meet an individual requirement of a user and a requirement of a changing display effect on a rear cover.

To resolve the technical problems, an embodiment of this application provides an electronic device and a rear cover. The electronic device may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not limited in this embodiment of this application.

An electronic device may include components such as a screen module, a mainboard, a battery, and a housing. The screen module, a circuit board, and the battery may all be installed in the housing, and the housing may include a rear cover, and in a thickness direction of the electronic device, the rear cover is disposed opposite to the screen module, and the rear cover is configured to support components such as the battery and the circuit board, and protect the components of the electronic device.

Figure 3:
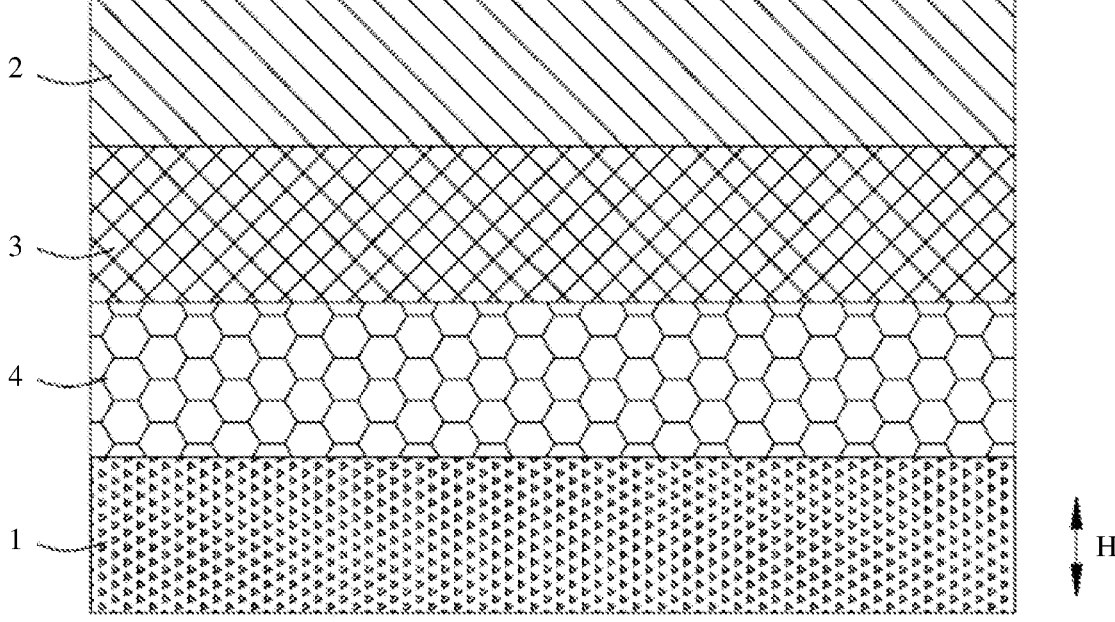
FIG. 3 is a schematic diagram of a laminated layer of a rear cover of an electronic device in a first specific embodiment according to this application.

Specifically, as shown in FIG. 3, the rear cover includes a cover 1 and an electrochromic layer 4, the electrochromic layer 4 and the cover 1 are arranged in the thickness direction H, and the electrochromic layer 4 and the cover 1 are connected. The cover 1 is of a transparent material, and may be specifically of a glass material or an organic material. The electrochromic layer 4 is connected to the mainboard, and a first controller of the mainboard can be configured to control whether to power on the electrochromic layer 4, and a color displayed on the electrochromic layer 4 when the electrochromic layer 4 is powered on is different from a color displayed when the electrochromic layer 4 is not powered on.

The rear cover in this embodiment is provided with the electrochromic layer 4, and colors displayed on the electrochromic layer 4 are different when the electrochromic layer 4 is powered on and off, so that without changing a decorative film, a color displayed on the electrochromic layer 4 can be changed by controlling a power-on and power-off status of the electrochromic layer 4, and a color displayed on the rear cover can be further changed. This has an advantage of convenient operation. Therefore, an effect displayed on the rear cover is not fixed in use, and a user can adjust, based on a requirement of the user (by changing the power-on and power-off status of the electrochromic layer 4), a color displayed on the rear cover, thereby meeting an individual requirement of the user, and improving user experience of the electronic device and the rear cover of the electronic device.

The electrochromic layer 4 may cover an entire rear cover. In this case, when the power-on and power-off status of the electrochromic layer 4 is changed, a color of the entire rear cover can be changed, thereby changing an effect on the rear cover of the electronic device. Alternatively, the electrochromic layer 4 can form one or more of a character, a pattern, and a LOGO. In this case, when the power-on and power-off status of the electrochromic layer 4 changes, a color of a formed character, pattern, or LOGO can be changed, thereby changing an effect displayed on the rear cover.

In a possible design, the first controller of the mainboard is not only configured to control the power-on and power-off status of the electrochromic layer 4, but also configured to control a magnitude of a current applied to the electrochromic layer 4, to change a shade of the color displayed on the electrochromic layer 4. In this embodiment, the power-on and power-off status of the electrochromic layer 4 and the magnitude of the current are changed, so that a plurality of different colors can be displayed on the electrochromic layer 4, and the rear cover can have a plurality of different effects, to meet an independent requirement of the user.

Specifically, when the electrochromic layer 4 is not powered on, the electrochromic layer 4 is transparent, when a maximum current Amax is applied to the electrochromic layer, the electrochromic layer 4 appears black, and when a current A applied to the electrochromic layer 4 gradually increases from 0 to Amax, the color displayed on the electrochromic layer gradually deepens. Therefore, the power-on and power-off status of the electrochromic layer 4 and the magnitude of the current are changed, so that different colors from transparent to black can be displayed on the electrochromic layer 4, and a larger current leads to a darker color. A current of the electrochromic layer 4 can be changed to independently control the color displayed on the rear cover.

In a specific embodiment, it is assumed that the electrochromic layer 4 forms a character "A", and the electrochromic layer 4 can change the color displayed on the electrochromic layer 4 when the electrochromic layer 4 is powered on and off. For example, during power-off, the color of the electrochromic layer 4 is transparent, and in this case, a transparent character "A" is displayed on the rear cover; when a maximum current Amax is applied, the color of the electrochromic layer 4 is black, and in this case, a black character "A" is displayed on the rear cover; and when the current that is applied is between 0 and Amax, the color displayed on the electrochromic layer 4 is brownish yellow with a variable shade, and in this case, a character "A" of brownish yellow is displayed on the rear cover.

In another specific embodiment, it is assumed that the electrochromic layer 4 covers the rear cover, and the electrochromic layer 4 can change the color displayed on the electrochromic layer 4 when the electrochromic layer 4 is powered on and off. For example, during power-off, the color of the electrochromic layer 4 is transparent; when a maximum current Amax is applied, the color of the electrochromic layer 4 is black; and when the current that is applied is between 0 and Amax, the color displayed on the electrochromic layer 4 is blue with a variable shade. The foregoing description is only a specific example, and the color displayed on the electrochromic layer 4 is subject to actual conditions in actual use.

Specifically, the mainboard is further provided with a second controller, the second controller is configured to determine whether a current needs to be applied and determine a value of the current A that is applied, and the first controller can control, based on a signal of the second controller, whether to power on the electrochromic layer, and control the value of the current A applied to the electrochromic layer. The first controller may be a power controller, and the second controller may be a mainboard controller.

In addition, the electronic device may be provided with a user control interface configured to control the electrochromic layer 4. The user control interface may include a rear cover color choice used by the user to independently control the color of the rear cover, and the rear cover color choice can include two or more options. For example, the user control interface may include four options: a $1^{st}$ option, a $2^{nd}$ option, a $3^{rd}$ option, and a $4^{th}$ option, where the $1^{st}$ option indicates transparent, the $2^{nd}$ option indicates blue, the $3^{rd}$ option indicates dark blue, and the $4^{th}$ option indicates black. Therefore, the user can enable, by selecting a corresponding option, a corresponding color to be displayed on the rear cover.

In addition, the mainboard is further provided with a chip, the chip is configured to identify the option tapped by the user, and the chip is configured to control the second controller, so that a color corresponding to the option is displayed on the electrochromic layer. The chip may be a chip that is fixed on the mainboard, or may be a chip that is disposed separately, and the chip is connected to the mainboard. The chip, the first controller, the second controller, the battery, the mainboard, and the electrochromic layer 4 may be in signal connection or electrical connection, for example, the chip, the first controller, and the second controller may be in Bluetooth connection, or may be connected through wires, or may be connected through a flexible circuit board (Flexible Printed Circuit, FPC).

In a specific embodiment, it is assumed that the user selects the $2^{nd}$ option, the chip identifies that the user selects the 2nd option, and the chip can send a signal to the second controller, and transfer option information to the second controller. The second controller determines a current A2 corresponding to the 2 option, and sends a signal to the first controller to apply the current A2, so that the first controller controls the mainboard to apply the current A2 to the electrochromic layer 4. A current of the battery is applied to the electrochromic layer 4 through the mainboard.

An option of the foregoing rear cover color choice may be a physical button disposed on the electronic device, or may be a touch button disposed inside the electronic device.

In another specific embodiment, the mainboard is further provided with a third controller, the chip is configured to sense a state of the electronic device, and the third controller is connected (including electrical connection or signal connection) to the first controller. The third controller is configured to control the first controller based on a sensing result of the chip, and then control whether to power on the electrochromic layer or control the magnitude of the current A, by using the first controller.

In this embodiment, the chip senses a state of the electronic device in a working process, and sends a signal to the third controller based on the state, and the third controller determines whether a current needs to be applied to the electrochromic layer 4 in this state and determines a magnitude of the current A, the third controller transfers a determining result to the first controller, so that the first controller can control the power-on and power-off status of the electrochromic layer 4 and the magnitude of the current A based on the determining result, thereby changing the color of the electrochromic layer 4. Therefore, through the third controller and the first controller, automatic control of the color of the rear cover can be implemented without manual control of the user, and display performance of the rear cover can be further improved; and according to the electronic device in this embodiment of this application, the color of the rear cover can be independently changed by the user, and in addition, the color of the rear cover can be independently changed during use of the electronic device, thereby further improving user experience.

Specifically, when the electronic device is in an incoming call state, the chip recognizes the incoming call state, and transfers a recognition signal to the third controller. The third controller determines, based on the recognition signal, a magnitude of a first current A1 that needs to be applied to the electrochromic layer 4, and transfers a determining result to the first controller, so that the first current A1 is applied to the electrochromic layer 4 through the first controller, and a specific color (a color corresponding to the first current A1, such as dark blue) is displayed on the rear cover of the electronic device in a case of an incoming call. When the electronic device is in a notification state (including SMS messages, notifications of applications of the electronic device, or the like), the chip recognizes the notification state, and transfers a recognition signal to the third controller. The third controller determines, based on the recognition signal, a magnitude of a second current A2 that needs to be applied to the electrochromic layer 4, and transfers a determining result to the first controller, so that the second current A2 is applied to the electrochromic layer 4 through the first controller, and a specific color (a color corresponding to the second current A2, such as blue) is displayed on the rear cover of the electronic device in a case of a notification. In addition, the color corresponding to the first current A1 and the color corresponding to the second current A2 may be different, so that the user can determine the state of the electronic device only by the color, to reduce a possibility of missing a call, thereby further improving user experience of the electronic device.

Specifically, the first controller may be a power controller, and the third controller may be a mainboard controller.

In a specific embodiment, the rear cover may include one or more electrochromic layers 4, and colors displayed on the electrochromic layers 4 are the same or different. In addition, the electrochromic layers 4 are arranged in a thickness direction H, or the electrochromic layers 4 are located on a same layer in the thickness direction H.

Figure 5:
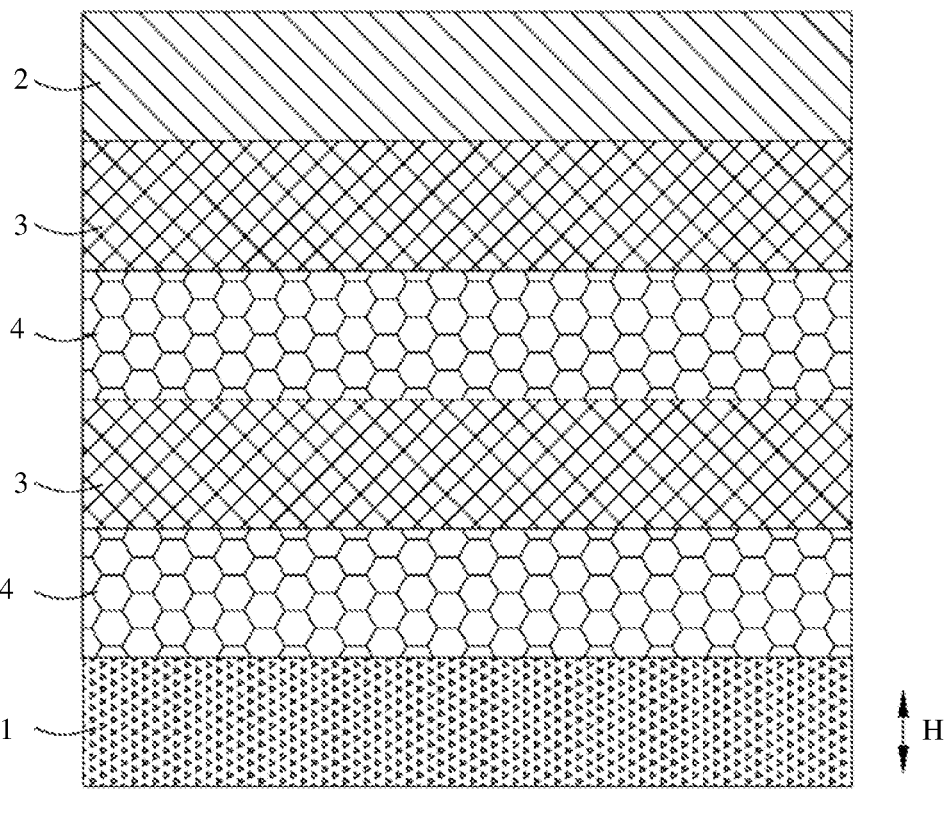
FIG. 5 is a schematic diagram of a laminated layer of a rear cover of an electronic device in a third specific embodiment according to this application.

Specifically, in the embodiment shown in FIG. 5, when the electrochromic layers 4 are arranged in the thickness direction H, the colors displayed on the electrochromic layers 4 can be superposed on each other in the thickness direction H, so that the rear cover can present richer appearance effects, and the rear cover can more meet an individual requirement of the user, thereby further improving user experience. For example, the rear cover includes a first electrochromic layer 41, a second electrochromic layer 42, and a third electrochromic layer 43, the three electrochromic layers are arranged in the thickness direction H, and the colors displayed on the three electrochromic layers may be different. It is assumed that the first electrochromic layer 41, the second electrochromic layer 42, and the third electrochromic layer 43 each form a character "A". Since colors displayed on the three electrochromic layers are different, the character "A" is finally displayed on the rear cover in a color obtained through superposition of the colors displayed on the first electrochromic layer 41, the second electrochromic layer 42, and the third electrochromic layer 43. In addition, the first electrochromic layer 41, the second electrochromic layer 42, and the third electrochromic layer 43 may have different glossiness degrees, so that an appearance effect of the rear cover is more exquisite and can more meet an individual requirement of the user.

Figure 6:
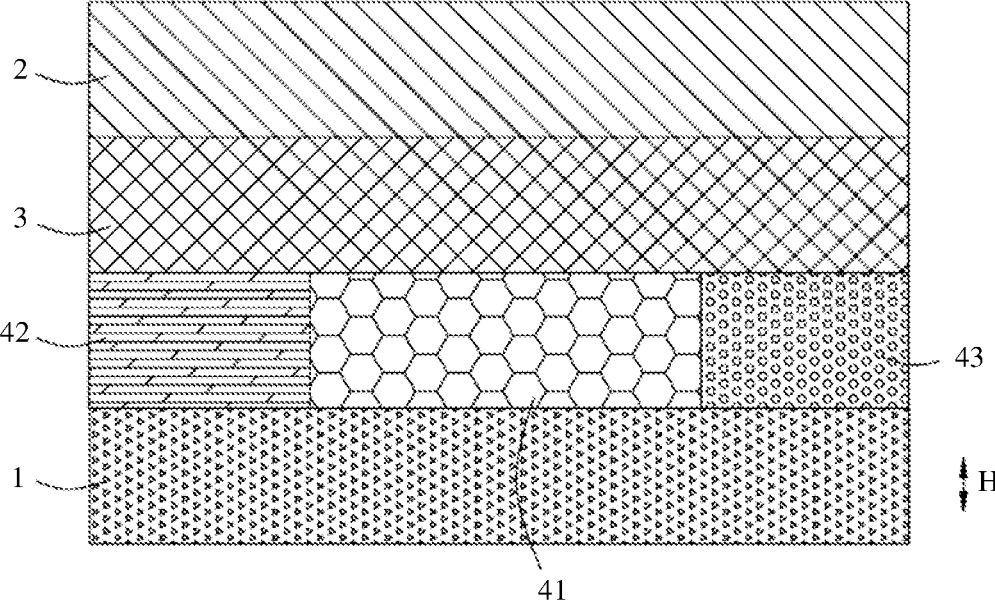
FIG. 6 is a schematic diagram of a laminated layer of a rear cover of an electronic device in a fourth specific embodiment according to this application.
Figure 7:
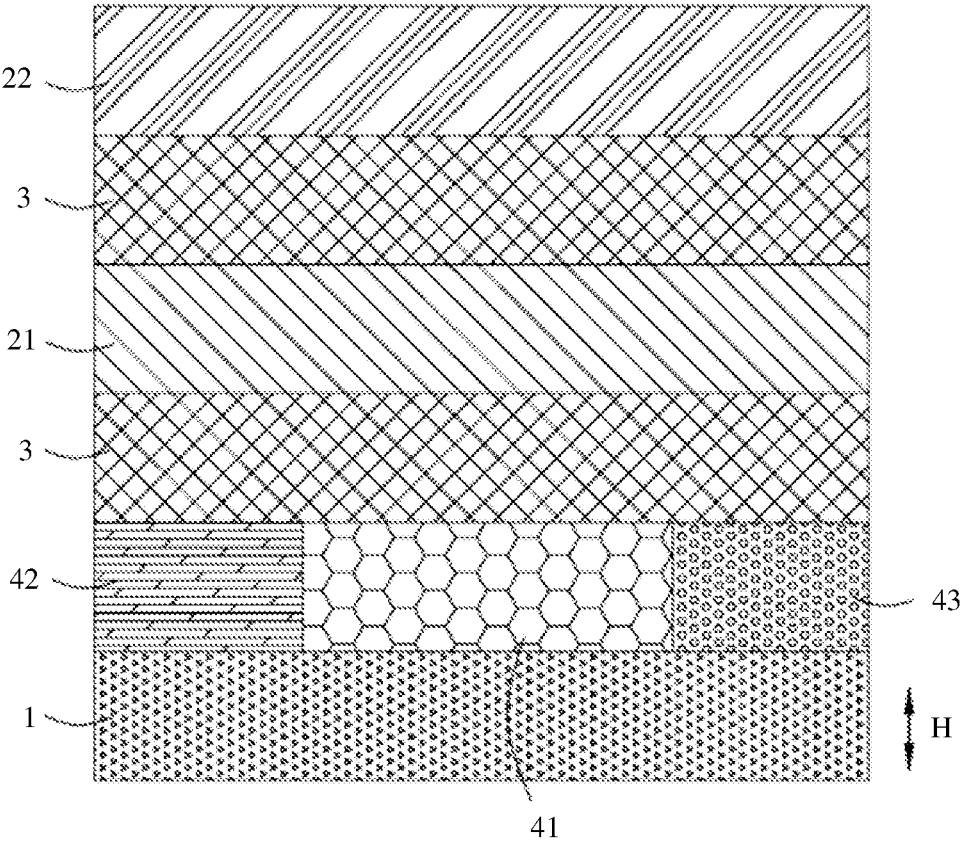
FIG. 7 is a schematic diagram of a laminated layer of a rear cover of an electronic device in a fifth specific embodiment according to this application.

In addition, when the electrochromic layers 4 are located on a same layer in the thickness direction H, the electrochromic layers 4 can be superposed on each other in a plane perpendicular to the thickness direction H, so that the rear cover can present richer appearance effects, and the rear cover can more meet an individual requirement of the user, thereby further improving user experience. For example, in the embodiment shown in FIG. 6 and FIG. 7, the rear cover includes a first electrochromic layer 41, a second electrochromic layer 42, and a third electrochromic layer 43, and the three electrochromic layers are located on a same layer in the thickness direction H, and areas of the three electrochromic layers are all less than an area of the cover 1. In addition, the first electrochromic layer 41, the second electrochromic layer 42, and the third electrochromic layer 43 are spliced with each other to form a structure with an area the same as or similar to an area of the cover 1. In addition, the colors displayed on the first electrochromic layer 41, the second electrochromic layer 42, and the third electrochromic layer 43 may be different or the same.

It is assumed that the first electrochromic layer 41, the second electrochromic layer 42, and the third electrochromic layer 43 each form a part of a character "A", and the three electrochromic layers are spliced to form the character "A". Since colors displayed on the three electrochromic layers are different, a character "A" in different colors is displayed on the rear cover. In addition, the first electrochromic layer 41, the second electrochromic layer 42, and the third electrochromic layer 43 may have different glossiness degrees, so that an appearance effect of the rear cover is more exquisite and can more meet an individual requirement of the user.

It should be noted that the plurality of electrochromic layers 4 may be separately connected to the mainboard and the controller, to be specific, the electrochromic layers 4 can be separately controlled, so that effects displayed on the rear cover have a plurality of combinations.

Figure 8:
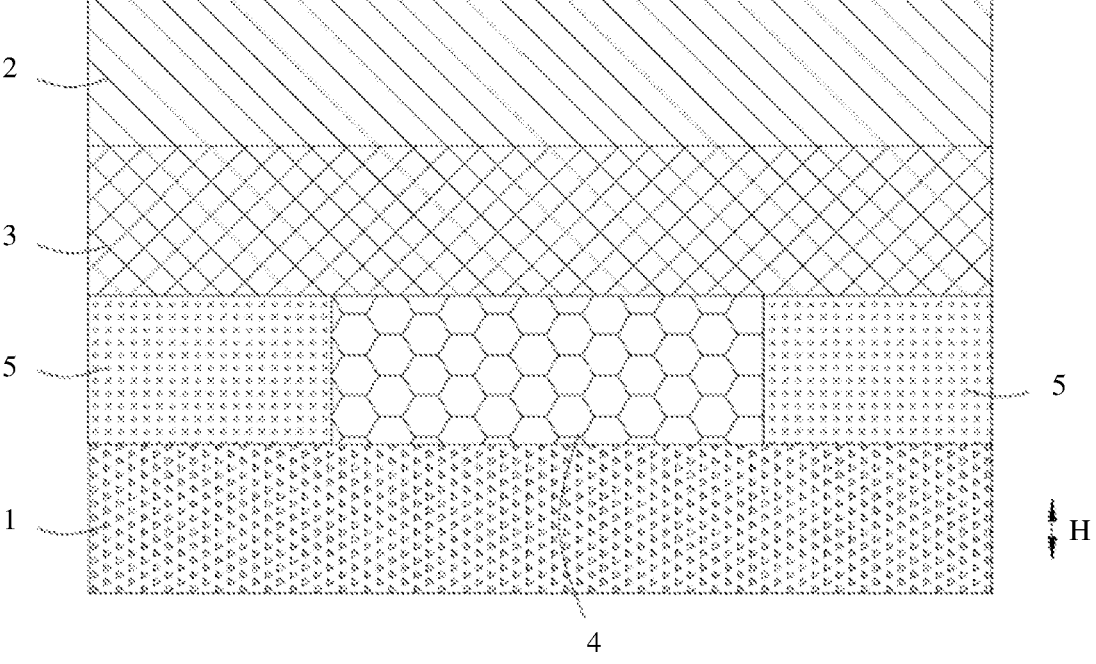
FIG. 8 is a schematic diagram of a laminated layer of a rear cover of an electronic device in a sixth specific embodiment according to this application.
Figure 9:
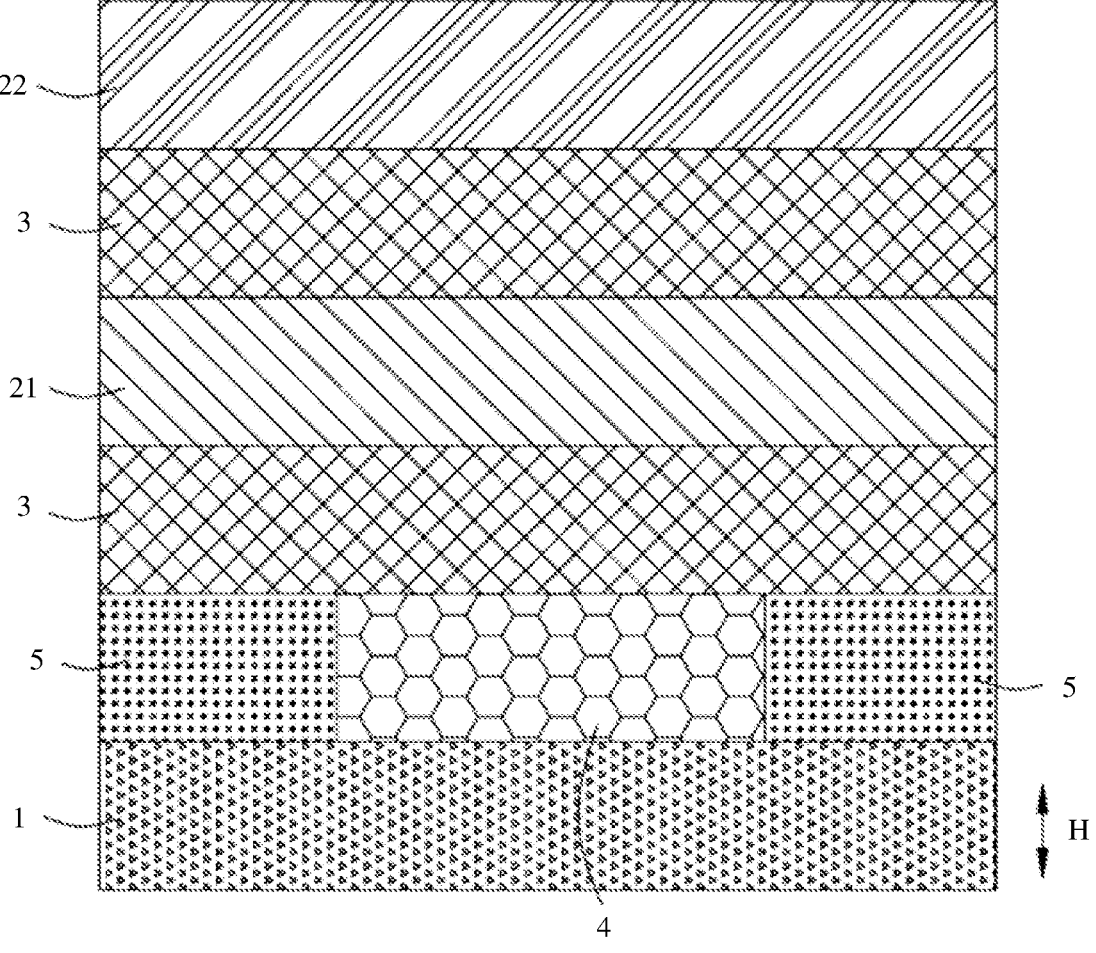
FIG. 9 is a schematic diagram of a laminated layer of a rear cover of an electronic device in a seventh specific embodiment according to this application.

In another specific embodiment, as shown in FIG. 3, in a plane perpendicular to the thickness direction H, an area of the electrochromic layer 4 is the same as an area of the cover 1, and the electrochromic layer and the cover match each other, so that in the rear cover, the electrochromic layer 4 completely fits the cover 1. As shown in FIG. 8 and FIG. 9, in a plane perpendicular to the thickness direction H, an area of the electrochromic layer 4 is less than an area of the cover 1, and in addition, the rear cover may include one or more transparent layers 5. Each transparent layer 5 is located on a same layer in the thickness direction H as the electrochromic layer 4, and is spliced with the electrochromic layer 4. The transparent layer 5 may be specifically optical clear adhesive, such as OCA adhesive.

Therefore, in an actual working condition, a size and a position of the electrochromic layer 4 can be set according to actual needs, as long as the electrochromic layer 4 does not exceed the cover 1.

In the foregoing embodiments, as shown in FIG. 5, the electrochromic layer 4 is bonded to the cover 1 through an optical clear adhesive layer 3, such as OCA adhesive; or the electrochromic layer 4 is formed on a surface of the cover 1 through a coating process.

In addition, as shown in FIG. 3, the rear cover may further include a decorative film 2, in the thickness direction H, the electrochromic layer 4 is located between the cover 1 and the decorative film 2, and the decorative film 2 can be bonded to the electrochromic layers 4 through an optical clear adhesive layer 3, such as OCA adhesive. The decorative film 2 can be designed to have a specific pattern, LOGO, character, color, or the like. Therefore, in this embodiment, a final effect displayed on the rear cover is obtained through superposition of an effect displayed on the electrochromic layer 4 and an effect displayed on the decorative film 2, thereby further enriching a display effect on the rear cover, so that the rear cover can further meet the individual requirement of the user, to improve user experience of the rear cover.

Figure 4:
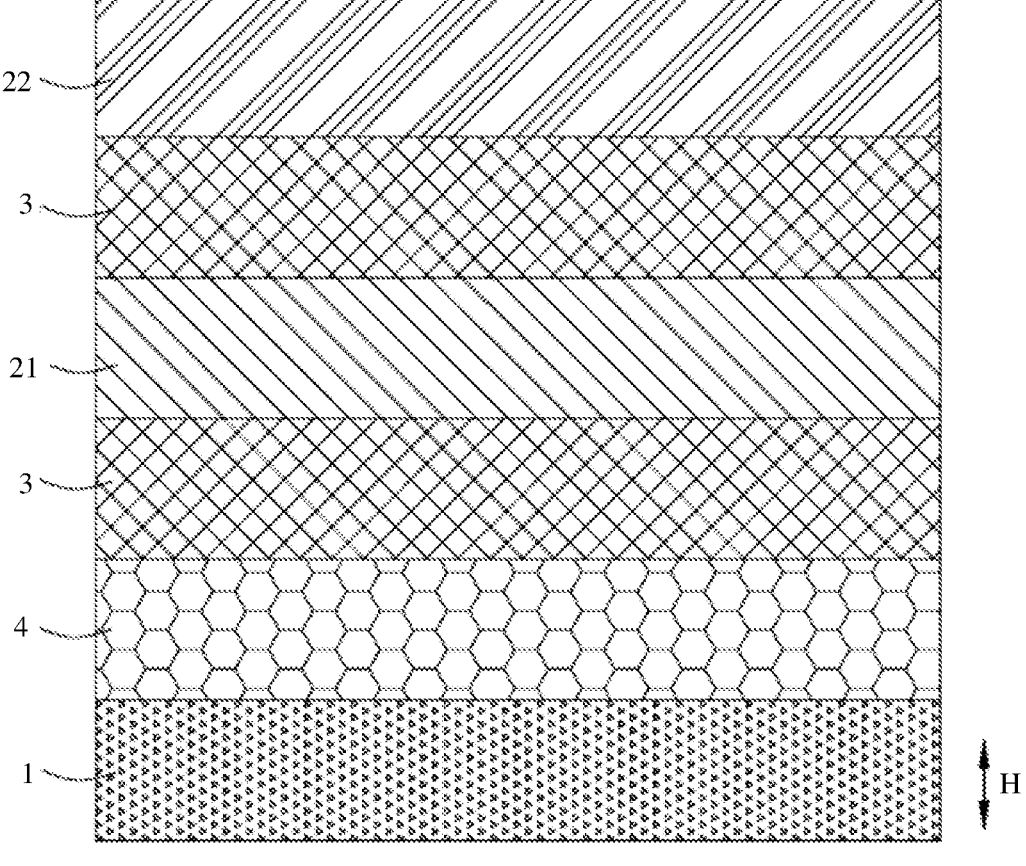
FIG. 4 is a schematic diagram of a laminated layer of a rear cover of an electronic device in a second specific embodiment according to this application.

Specifically, as shown in FIG. 4, the rear cover includes at least a first decorative film 21 and a second decorative film 22, the first decorative film 21 and the second decorative film 22 are arranged in the thickness direction H, and the electrochromic layer 4 is disposed on the cover 1 (the electrochromic layer 4 is bonded, through the optical clear adhesive layer 3, to or formed on the surface of the cover 1 through the coating process). The first decorative film 21 is bonded to the electrochromic layer 4 through the optical adhesive layer 3, and the second decorative film 22 is bonded to the first decorative films 21 through the optical adhesive layer 3. In this case, a display effect on the rear cover is obtained through superposition of the first decorative film 21, the second decorative film 22, and the electrochromic layer 4.

Alternatively, in addition to the electrochromic layer 4 connected to the cover 1, the rear cover may include an electrochromic layer 4 located between the first decorative film 21 and the second decorative film 22, and the electrochromic layer 4 can be bonded to each of the first decorative film 21 and the second decorative film 22 through an optical clear adhesive layer 3. In this case, a display effect on the rear cover is obtained through superposition of the first decorative film 21, the second decorative film 22, and the two electrochromic layers 4.

In conclusion, in this embodiment of this application, one or more electrochromic layers 4 may be included, and one or more decorative films 21 may also be included. A quantity of electrochromic layers 4 and a quantity of decorative films 2 are not limited in this application.

In the foregoing embodiments, a material of the electrochromic layer 4 includes one or more of electrochromic materials. The electrochromic material refers to a phenomenon that optical properties (including reflectivity, transmittance, absorption rate, and the like) of the material undergo a stable and reversible color change under an action of an external electric field, and exhibits a reversible change in a color and transparency in terms of an appearance. The electrochromic material includes an inorganic electrochromic material and an organic electrochromic material. The inorganic electrochromic material includes one or more of a group VI metal oxide and a group VIII metal oxide, such as tungsten trioxide and oxide Iridium, and the organic electrochromic material includes polythiophenes and polythiophene derivatives, viologens, tetrathiafulvalenes, metal phthalocyanine compounds, and the like.

In a specific embodiment, the electrochromic layer 4 includes a tungsten oxide layer, a silicon layer, and a nickel oxide layer in the thickness direction. The silicon layer is transparent and is configured to connect the tungsten oxide layer and the nickel oxide layer. In addition, the nickel oxide layer may be doped with metal tungsten. In this case, an effect from transparent to brown to black may be displayed on the electrochromic layer 4, and a shade of the color can be changed when a magnitude of a current applied to the electrochromic layer 4 is different.

In another specific embodiment, the electrochromic layer 4 includes a tungsten oxide layer, a silicon layer, and a nickel oxide layer in the thickness direction. The nickel oxide layer is doped with metal tungsten. In this case, an effect from transparent to dark blue to black may be displayed on the electrochromic layer 4, and a shade of the color can be changed when a magnitude of a current applied to the electrochromic layer 4 is different.

It should be noted that a part of this patent application document contains content protected by copyright. The copyright owner reserves the copyright except for making copies of the patent document or recorded patent document content in the China National Intellectual Property Administration.

What is claimed is:

1. An electronic device, comprising:
   a battery;
   a mainboard, wherein the battery is connected to the mainboard, and the mainboard comprises a first controller, a chip configured to sense a state of the electronic device, and a third controller that is connected to the first controller; and
   a housing, wherein the battery and the mainboard are in a cavity of the housing, and the housing comprises a rear cover; and wherein the rear cover comprises an electrochromic layer, the electrochromic layer is connected to the mainboard, wherein the third controller is configured to control the first controller, based on a sensing result of the chip, to control, using the first controller, whether the electrochromic layer is powered on, and a color displayed on the electrochromic layer when the electrochromic layer is powered on is different from a color displayed when the electrochromic layer is not powered on, and
   wherein the third controller is further configured to control the first controller, based on the sensing result of the chip, to variably control, using the first controller, a magnitude of a current applied to the electrochromic layer, and wherein varying the magnitude of the current applied to the electrochromic layer changes a shade of a color displayed on the electrochromic layer.

2. The electronic device according to claim 1, wherein when the electrochromic layer is not powered on, the electrochromic layer is transparent, and when a maximum current Amax is applied to the electrochromic layer, the electrochromic layer appears black; and
   wherein when a magnitude of the current A applied to the electrochromic layer gradually increases from 0 to Amax, the color displayed on the electrochromic layer gradually deepens.

3. The electronic device according to claim 1, wherein the mainboard further comprises a second controller, and the second controller is configured to:
   determine whether to apply the current to power on the electrochromic layer; and
   when it is determined to apply the current to power on the electrochromic layer, determine a magnitude of the current A to apply to the electrochromic layer; and
   wherein the first controller is configured to control, based on a signal of the second controller, whether the electrochromic layer is powered on, and to control the magnitude of the current A applied to the electrochromic layer.

4. The electronic device according to claim 3, wherein the electronic device further comprises:
   a display, configured to display a user control interface, wherein the user control interface comprises a rear cover color choice, and the rear cover color choice comprises two or more options; and
   wherein the mainboard further comprises a chip, the chip is configured to:
   identify an option tapped by a user; and
   control the second controller to output the signal that causes the electrochromic layer color to have a color corresponding to the option tapped by the user.

5. The electronic device according to claim 3, wherein the first controller is a power controller, and the second controller is a mainboard controller.

6. The electronic device according to claim 1, wherein the electronic device is configured in a manner that:
   when the electronic device is in an incoming call state, the third controller controls the first controller to cause a first current A1 to be applied to the electrochromic layer using the first controller; and
   when the electronic device is in a notification state, the third controller controls the first controller to cause a second current A2 to be applied to the electrochromic layer using the first controller; and
   wherein a color displayed on the electrochromic layer when the first current A1 is applied is different from a color displayed on the electrochromic layer when the second current A2 is applied.

7. The electronic device according to claim 1, wherein the first controller is a power controller, and the third controller is a mainboard controller.

8. The electronic device according to claim 1, wherein the electrochromic layer covers the rear cover.

9. The electronic device according to claim 1, wherein the electrochromic layer covers a part of the rear cover and is one or more of a character, a pattern, or a logo.

10. The electronic device according to claim 1, wherein a material of the electrochromic layer comprises an inorganic electrochromic material or an organic electrochromic material; and wherein the inorganic electrochromic material comprises one or more of a group VI metal oxide or a group VIII metal oxide, and the organic electrochromic material comprises one or more of polythiophenes and polythiophene derivatives, viologens, tetrathiafulvalenes, or metal phthalocyanine compounds.

11. The electronic device according to claim 1, wherein the electrochromic layer comprises a tungsten oxide layer, a silicon layer, and a nickel oxide layer overlapping each other in a thickness direction of the electronic device; and wherein the nickel oxide layer is doped with tungsten or vanadium.

12. The electronic device according to claim 1, wherein the rear cover comprises one or more electrochromic layers, and colors displayed on each of the electrochromic layers are the same or different; and wherein the one or more electrochromic layers are arranged to overlap each other in a thickness direction of the electronic device, or the one or more electrochromic layers are located on a same layer.

13. The electronic device according to claim 1, wherein the rear cover further comprises a cover layer and a transparent layer, and the cover layer is located outside the electrochromic layer;

wherein the electrochromic layer matches the cover layer; and wherein in a plane perpendicular to a thickness direction of the electronic device, an area of the electrochromic layer is less than an area of the cover layer, the transparent layer is located on a same layer as the electrochromic layer, and the electrochromic layer is spliced with the transparent layer.

14. The electronic device according to claim 1, wherein the rear cover further comprises a decorative film, and the electrochromic layer and the decorative film are arranged to overlap each other in a thickness direction of the electronic device.

15. The electronic device according to claim 14, wherein the rear cover comprises a cover layer and one layer of the decorative film, and the decorative film is located at an end, of the electrochromic layer, that faces away from the cover layer in the thickness direction of the electronic device.

16. The electronic device according to claim 14, wherein the rear cover comprises a cover, and the decorative film comprises at least a first decorative film and a second decorative film, and wherein:

in the thickness direction, the electrochromic layer is located between the first decorative film and the cover, and the second decorative film is located at an end, of the first decorative film, that faces away from the electrochromic layer; or in the thickness direction, the electrochromic layer is arranged between the cover and the first decorative film, and between the first decorative film and the second decorative film.

17. The electronic device according to claim 14, wherein the rear cover comprises a cover, and wherein:

the electrochromic layer is bonded to the cover through optical clear adhesive; or the electrochromic layer is formed on a surface of the cover through a coating process.

18. An electronic device, comprising:

a battery;

a mainboard, wherein the battery is connected to the mainboard, and the mainboard comprises a first controller and a second controller; and a housing, wherein the battery and the mainboard are in a cavity of the housing, and the housing comprises a rear cover; and wherein the rear cover comprises an electrochromic layer, the electrochromic layer is connected to the mainboard, the first controller is configured to control whether the electrochromic layer is powered on, and a color displayed on the electrochromic layer when the electrochromic layer is powered on is different from a color displayed when the electrochromic layer is not powered on, wherein the first controller is further configured to variably control a magnitude of a current applied to the electrochromic layer, and varying the magnitude of the current applied to the electrochromic layer changes a shade of a color displayed on the electrochromic layer, and wherein the second controller is configured to:

determine whether to apply the current to power on the electrochromic layer; and when it is determined to apply the current to power on the electrochromic layer, determine a magnitude of the current A to apply to the electrochromic layer; and wherein the first controller is configured to control, based on a signal of the second controller, whether the electrochromic layer is powered on, and to control the magnitude of the current A applied to the electrochromic layer.

19. The electronic device according to claim 18, wherein the electronic device further comprises:

a display, configured to display a user control interface, wherein the user control interface comprises a rear cover color choice, and the rear cover color choice comprises two or more options; and wherein the mainboard further comprises a chip, the chip is configured to:

identify an option tapped by a user; and control the second controller to output the signal that causes the electrochromic layer color to have a color corresponding to the option tapped by the user.

20. The electronic device according to claim 18, wherein the first controller is a power controller, and the second controller is a mainboard controller.

* * * * *